United States Patent Office 2,825,066
Patented Mar. 4, 1958

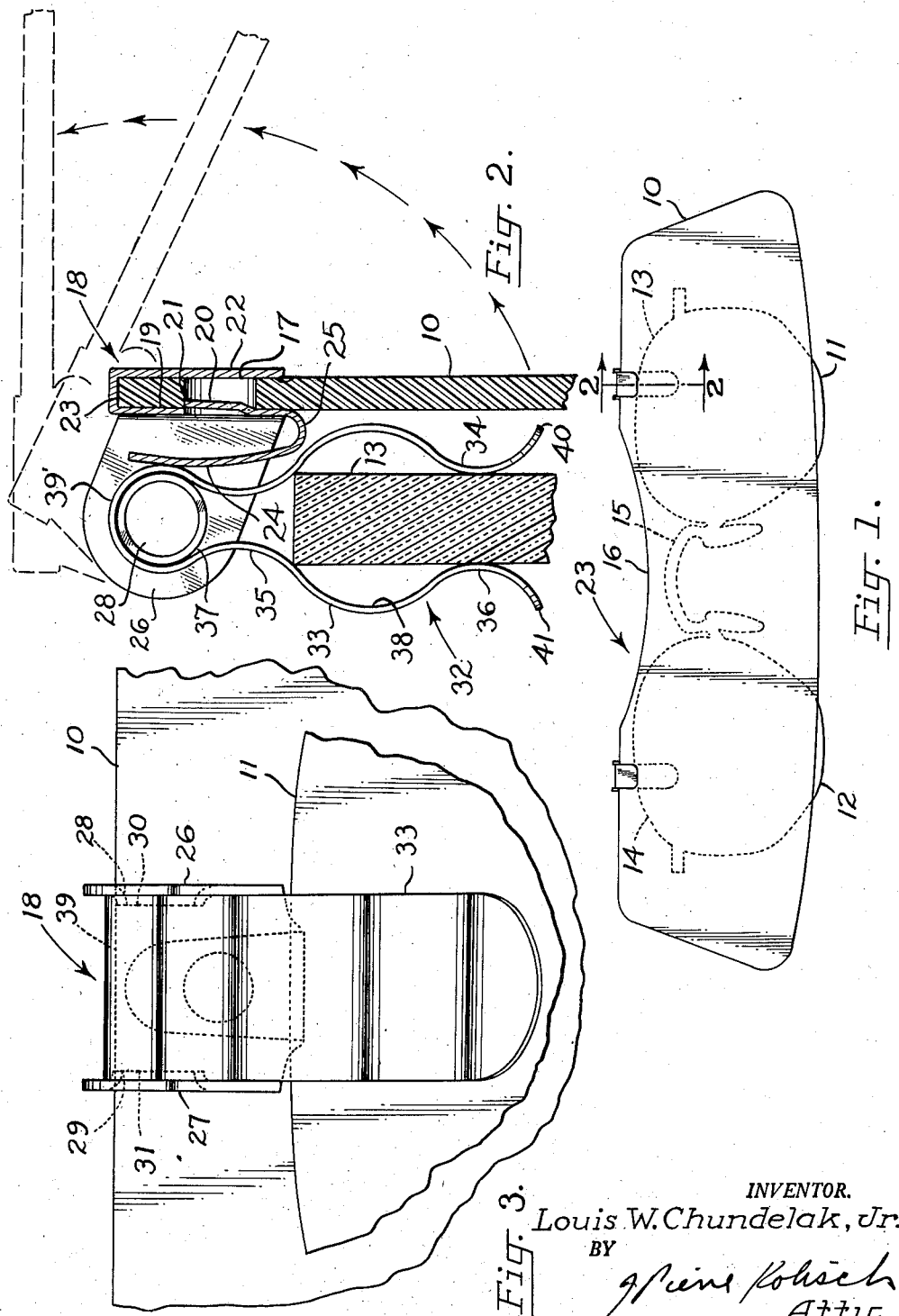

2,825,066

EYE SHADE FOR GLASSES

Louis W. Chundelak, Jr., Portland, Oreg.

Application April 20, 1956, Serial No. 579,620

8 Claims. (Cl. 2—13)

This invention relates to an eye shade and more particularly to a demountable attachment which may be affixed to the rims of eyeglasses, spectacles, and the like.

Heretofore, in order for a person who wore eyeglasses to shade his eyes from sources of bright light, such as sunlight, it was necessary for him to have either a separate pair of sunglasses ground to his prescription, or a pair of colored lenses which could be clipped on over his glasses, or wear a separate visor. All of these attachments are somewhat cumbersome and not particularly handy.

The object of the present invention is to provide an inexpensive attachment for a pair of eyeglasses which may readily be mounted on the glasses and moved into different operative positions desired by the wearer.

According to the invention, a sheet of transparent material, whose transparency may be diminished by tinting or coloring, is pivotally fastened by novel clamping means to the upper rims of the glasses. The transparent sheet may be pivotally positioned in different operative positions to provide any desired degree of shading to the eyes of the wearer.

An important feature of the invention is the novel clamping or fastening means by which the eyeglasses and eye shade are hingedly or pivotally connected to one another. The clamping means comprise two clamping members one of which is held in frictional engagement with the eye shade and the other in frictional engagement with the eyeglasses. The two clamping members are hingedly connected to each other under tension and friction and no bolts, rivets, pins, screws or other fastening elements are employed. The parts are easily and securely connected to each other which makes for fast, reliable and inexpensive manufacture of the devices in large quantities.

Another feature of the invention is that the eye shade may be made of plastic material which may be easily carried in any pocket without necessity of a case and without fear of damage or breaking.

The features of the invention will be described in detail in connection with the following drawings, in which:

Fig. 1 is a front elevation showing an eye shade according to the invention mounted on a pair of glasses;

Fig. 2 is an enlarged section taken on the lines 2—2 of Fig. 1; and

Fig. 3 is an enlarged back elevation of a portion of Fig. 1.

10 is a sheet of material, preferably of transparent or semitransparent, tinted or colored plastic. The dimensions of the sheet, as shown in Fig. 1, are such as at least to cover the area of the lenses of a pair of glasses having lenses 11, 12 and upper rim portions 13, 14 and a nose bridge 15. A cutout portion 16 is provided in sheet 10 to accommodate the bridge of the nose of a wearer of the device.

Referring to Figs. 2 and 3, two holes 17 (one of which is shown) are provided in sheet 10 near its top edge and the holes are spaced a distance apart approximately that of the centers of lenses 11, 12. A pair of clamping members, one of which is generally indicated at 18, each of which preferably comprises a single piece of stiff, resilient material such as spring steel, are formed into the configurations shown in the drawings. Center portion 19 of the clamp is flat except for a dimple 20 which has been partially broken out of the surface of portion 19 to provide a shoulder 21 which engages the inside edge of hole 17 in sheet 10. A forwardly turned over portion 22 of the clamp is joined to portion 19 at 23 and is substantially parallel and coextensive with portion 19. The edge of sheet 10 is firmly held between portions 19 and 22, which are spaced apart prior to the insertion of sheet 10 between portions 19 and 22 a distance slightly less than the thickness of the sheet.

Portion 24 of the clamp is reversely turned from portion 22 into a tonguelike configuration which extends in Fig. 2 upwardly from edge 25 of portion 19 towards 23, the end of portion 24 turning inwardly at a slight angle toward portion 19.

A pair of depending ears 26, 27 extend outwardly at about right angles from opposite side edges of center portion 19. Holes 28, 29 in alignment with each other are provided near the outer ends of ears 26, 27. Inwardly turned annular flanges 30, 31 surround holes 28, 29.

Another pair of clamping members, one of which is generally indicated at 32, each of which preferably comprises a single piece of material like that of clamping member 18, has oppositely disposed legs 33, 34. Legs 33, 34 have corrugations 35, 36 formed therein to provide spaces 37, 38 therebetween. The diameter of space 37 is about the same as that of flanges 28, 29 so that the opposite side edges of legs 33, 34 will engage the flanges to provide pivotal connection between members 18 and 32.

The width of member 32 at its upper end 39 is slightly larger than the distance between ears 26, 27 prior to the insertion of member 32 between the ears, so that members 18 and 32 are held together under tension and are yieldingly pivotable with respect to each other when member 32 is inserted between and clamped by ears 26, 27. Tongue 24 also engages top surface 39' of member 32 and serves as a springlike restraint so that the position of member 32 with respect to member 18 will remain fixed until moved.

Open ends 40, 41 of member 32 are outturned to permit rims 13, 14 of the glasses to pass between legs 33, 34 and be clamped therebetween.

As shown in Fig. 2, sheet 10 may be positioned in any number of operative positions depending on the amount of shading desired, which may vary anywhere from a lower position, shown in solid lines, to a number of raised positions, some of which are shown in dotted lines. The sheet may be easily moved by hand from one position to another and will remain in the last position it has been placed because of the restrained pivotal connection between members 18 and 32 afforded by portion 24 which constitutes a braking means in the device.

The device is adaptable to almost any pair of eyeglasses regardless of whether they have frames or not since clamps 32 are adaptable to a wide range of thicknesses.

An eye shade according to the invention has many uses and the feature of being able to move the shade quickly into and out of operative position is particularly useful in such applications as night driving where it is desired only briefly to shade the eyes when meeting the bright headlights of oncoming cars.

While a preferred embodiment of the invention has been shown and described, modifications and changes will be suggested to those skilled in the art and it is intended to cover all such modifications and changes and to

I claim:

1. A shade for a pair of eyeglasses comprising a sheet of transparent material; a first pair of clamping members of stiff resilient material each having a center portion, and reversely turned portions on either side of the center portion, the sheet of material being clamped in each of said clamping members between the center portion and one of the reversely turned portions; a second pair of clamping members of stiff resilient material each of which is pivotally connected to one of the first clamping members and in engagement with said other reversely turned portion, said other reversely turned portion frictionally engaging the second clamping member so as to restrain relative pivotal movement of the first and second clamping members; and a pair of legs on each of the second clamping members for frictionally attaching said members to the eyeglasses.

2. The device according to claim 1 and in which the sheet of transparent material may be colored and is of a size at least to cover the area of both lenses of the eyeglasses.

3. The device according to claim 1 and in which holes are provided near one edge of the sheet material, and dimples are formed in the center portion adapted to engage the sheet at said holes.

4. An eye shade for a pair of eyeglasses having rim portions comprising a sheet of transparent material having two holes spaced from each other adjacent an edge of the material; a pair of first clamping members of stiff resilient material each comprising a flat center portion, a reversely turned flat clamping portion spaced from the center portion, the sheet of transparent material being firmly held between the center and reversely turned clamping portions of each clamping member, and a braking portion reversely turned in a direction opposite from said flat clamping portion; a pair of second clamping members of stiff resilient material; means pivotally mounting each of said second clamping members in each of said first clamping members, respectively, with the braking portion of the first clamping member frictionally engaging the second clamping member and restraining relative pivotal movement of the two clamping members; and means for fastening the rim portions of the glasses to the second pair of clamping members.

5. An eye shade for a pair of eyeglasses having rim portions comprising a sheet of transparent material having two holes spaced from each other adjacent an edge of the material; a pair of unitary first clamping members of stiff resilient material each comprising a flat center portion, a raised dimple centrally located in said center portion adapted to fit tightly into a hole in the transparent material, a reversely turned flat clamping portion spaced from and substantially parallel to the center portion, the sheet of transparent material being firmly held between the center and reversely turned clamping portions of each clamping member, a braking portion reversely turned in a direction opposite from said flat clamping portion, and a pair of ears depending from the center portion; and a pair of unitary second clamping members each pivotably mounted in the pair of ears of one of said first clamping members with the braking portion of each first clamping member engaging a second clamping member so as to restrain relative pivotal movement of the two clamping members; each of said second clamping members having means for fastening the member to a rim portion of the eyeglasses.

6. An eye shade for a pair of eyeglasses having rim portions comprising a sheet of semitransparent plastic material having two holes spaced from each other adjacent an edge of the material; a pair of unitary first clamping members of spring steel each comprising a flat center portion, a raised dimple centrally located in said center portion adapted tightly to engage a hole in the semitransparent material, a reversely turned flat clamping portion spaced from and substantially parallel and coextensive with said center portion, the sheet of transparent material being firmly held between the center and reversely turned clamping portions of each clamping member, a braking portion reversely turned in a direction opposite from said flat clamping portion and extending from one end of the center portion towards the other end of the center portion, a pair of ears depending from opposite sides of the center portion at right angles thereto and having holes in alignment near the outer ends of said ears, and an inwardly turned annular flange surrounding each of said holes; a second pair of unitary clamping members of spring steel each of which is pivotally mounted between the depending pair of ears of a first clamping member, the annular flange surrounding each of said holes in each pair of ears engaging opposite side edges of the second clamping member, the braking portion of each of said first clamping members engaging one of the second clamping members so as to restrain relative pivotal movement of the two clamping members, each of said second clamping members having means for fastening the member to a rim portion of the eyeglasses.

7. The combination of an eyeglass shade and means for pivotally mounting the eyeglass shade on a pair of eyeglasses, said means comprising a first clamping member of resilient material having a pair of integrally formed, opposed clamping portions biased inwardly toward one another thereby to grip said eyeglass shade, a second clamping member of resilient material having a pair of integrally formed opposed clamping portions biased inwardly toward one another thereby to grip said eyeglasses, means projecting from one of said clamping members mounting the other of said clamping members and accommodating relative pivotal movement between the two clamping members, and a braking arm secured to one of said clamping members operable to restrain relative pivotal movement between the two clamping members, said braking arm having a free end biased against the other of said clamping members and restraining pivotal movement by frictionally clamping against said other of said clamping members.

8. The combination of an eyeglass shade and means for pivotally mounting the eyeglass shade on a pair of eyeglasses, said means comprising a first clamping member of resilient material having a pair of integrally formed opposed clamping portions biased inwardly toward one another thereby to grip said eyeglass shade, said first clamping member having shoulder means protruding inwardly from one of its clamping portions and seating within a depression provided in said eyeglass shade so as to fix said clamping member to said eyeglass shade, a second clamping member of resilient material having a pair of integrally formed opposed clamping portions biased inwardly toward one another thereby to grip said eyeglasses, means projecting from one of said clamping members mounting the other of said clamping members and accommodating relative pivotal movement between the two clamping members, and a braking arm secured to one of said clamping members operable to restrain relative pivotal movement between the two clamping members, said braking arm having a free end biased against the other of said clamping members and restraining pivotal movement by frictionally clamping against said other of said clamping members.

References Cited in the file of this patent

UNITED STATES PATENTS

| | | |
|---|---|---|
| 809,702 | Kovacs | Jan. 9, 1906 |
| 1,419,322 | Smith | June 13, 1922 |
| 2,388,626 | Wilson | Nov. 6, 1945 |
| 2,393,955 | Baratelli et al. | Feb. 5, 1946 |
| 2,752,598 | Abels | July 4, 1956 |